United States Patent [19]

Penterman et al.

[11] 4,135,614
[45] Jan. 23, 1979

[54] PORTABLE RADIAL STACKER

[75] Inventors: Lou F. Penterman, Milliken; Harry Geverink, Markham, both of Canada

[73] Assignee: Assinck Bros. Limited, Markham, Canada

[21] Appl. No.: 787,876

[22] Filed: Apr. 15, 1977

[51] Int. Cl.² ............................................. B65G 41/00
[52] U.S. Cl. .................................................. 198/306
[58] Field of Search ....................... 198/300, 302, 306; 172/507, 386; 280/111

[56] References Cited

U.S. PATENT DOCUMENTS

| 3,334,912 | 8/1967 | Mauck | 280/111 X |
| 3,552,546 | 1/1971 | Rath | 198/306 |

Primary Examiner—Robert B. Reeves
Assistant Examiner—James L. Rowland
Attorney, Agent, or Firm—George H. Riches and Associates

[57] ABSTRACT

An axle assembly for use with a portable radial stacker. The assembly includes a transverse member which is secured to the end of the supporting structure of the stacker proximate the ground and the member is aligned transversely to the direction of the conveyor belt. An axle bar is secured between two pairs of tires and two torsion levers complete the assembly. One end of each torsion lever is secured to the central part of the axle bar between each pair of tires and the opposite end of each torsion lever pivotally connects one end of the transverse member. Each tire has an independent suspension mounting and at least one drive means is provided for driving at least one pair of said tires.

7 Claims, 7 Drawing Figures

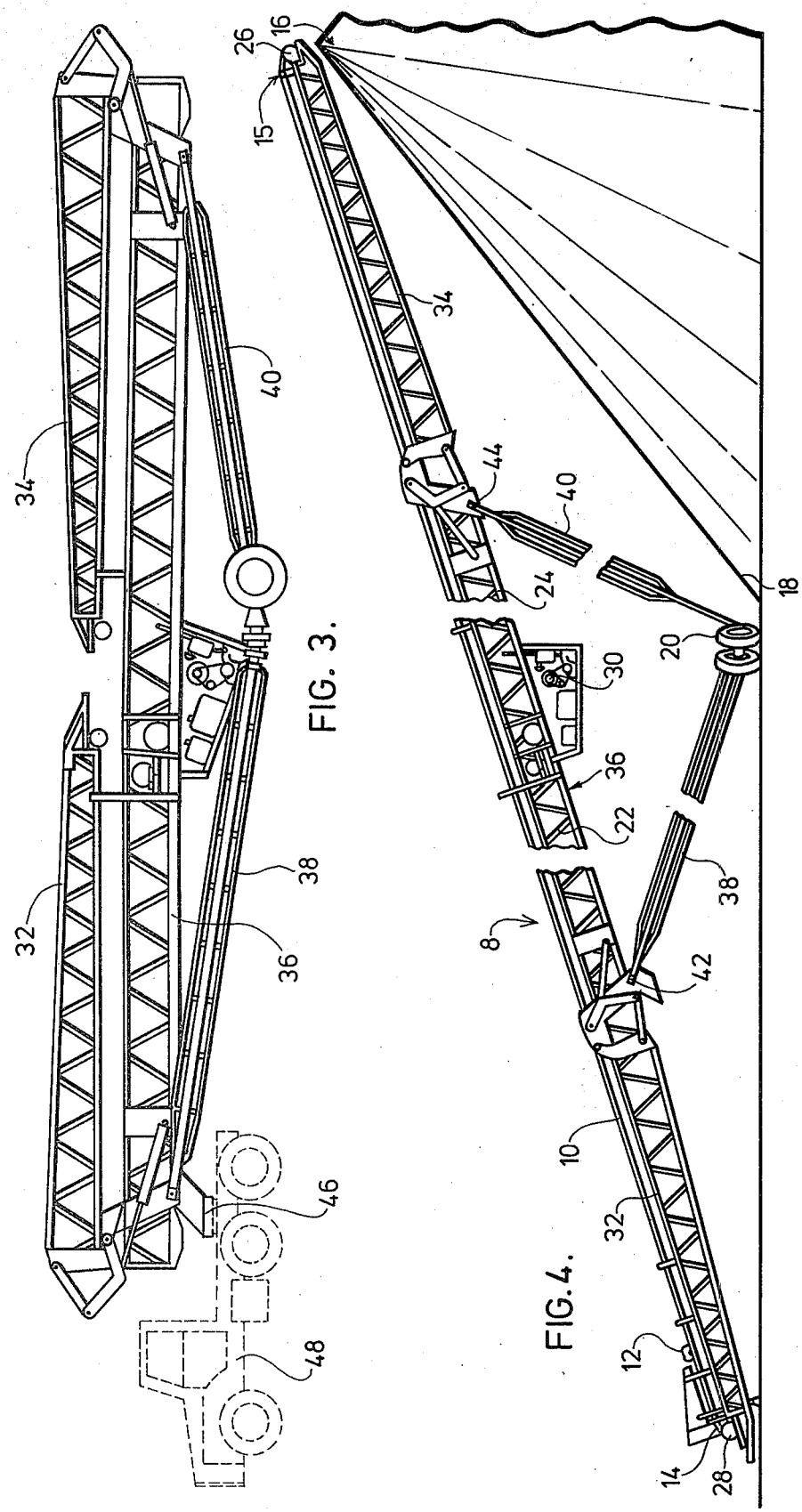

PORTABLE RADIAL STACKER

BACKGROUND OF THE INVENTION

1. Field of the Invention

This invention relates generally to material handling systems, and more particularly, to a novel axle construction for portable radial stackers.

2. Description of the Prior Art

Conveyor systems and devices used to stack or pile material are well known in the art. These devices utilize various principles of the conveying art, including augers, conveyor belts, buckets and similar conveying means. The material may be moved intermittently or may be moved continuously to a stockpile and in fact, may include movement in the vertical, horizontal or inclined directions.

One of the specific applications for the conveyor system is to stockpile loose bulk material including such material as earth, coal, sand, ore, grain. These materials are generally stockpiled by using a conveyor system which transports the material from the material loading position at an angle inclined upwards and then the material is dropped off the end of the conveyor (the material unloading position). As this material is loose material, it will form a conical-shaped pile of its own accord.

More recently, in order to minimize the area necessary to stockpile this loose material, radial stackers have been used. Radial stackers are conveyor systems wherein the terminal end can pivot in an arc around the point where the material is loaded onto the conveyor. Thus, the material is stockpiled in an arc thereby allowing much more of the material to be stockpiled within a specified area than would be stacked if separate piles were used.

Recently, radial stackers have been designed to be portable, that is, designed to be able to be transported from one location to another. These devices are attached to the rear of a truck or other transporting vehicle and are towed from one location to another. A supporting means is provided which, in addition to supporting the stacker at the desired angle during use, provides a set of wheels upon which the rear portion of the stacker is supported during transporting. This has removed the necessity of placing the stacker on a bed during transportation and has increased the utility of the stacker tremendously.

Many of these constructions utilize telescopic axles to allow the stacker to lie flat during transport but they suffer from the disadvantage that the load concentration point during stacking and the carrying concentration point during transporting are the same. This is, the concentration point of the axle during both the loading stage and the transportation stage is located at the balance point of the conveyor. Thus, when the stacker is transported, uplifting will occur at the fifth wheel pin of the truck creating an unstable and dangerous condition. This is particularly prevalent when the stacker is transported over rough roads and terrain. The impact impulses which are caused by the rough road creates a lifting action at the fifth wheel pin of the truck which will cause breakage and is very hazardous.

It has been proposed to reduce this uplifting effect by moving the wheels of the stacker more towards the rear. However, this will decrease the stockpiling capacity of the stacker for two essential reasons. If the wheels are moved rearward, the material which is stockpiled will bury the wheels if the same angle of inclination is used for the stacker. If the angle is raised, more elaborate machinery is necessary and the wheels of the stacker will still be buried during use.

If the wheels of the support means of the stacker are moved forward towards the front of the stacker to increase the stockpiling capacity, this creates very hazardous road conditions during transporting the stacker as the uplifting of the fifth wheel pin on the truck is increased. It is possible to reinforce the fifth wheel pin on the transporting vehicle however this increases the costs substantially and decreases the safety factor during transportation of the stacker.

The effect of the impact impulses caused by the road conditions during the transporting of the stackers is a very serious problem. Some of the impulses may be absorbed by the tires themselves but it has been found with the devices presently in use that the tires manufactured today cannot absorb all the impulses created by the road conditions during the transportation of these stackers. Blow-outs of the tires are very common and irreperable damage is done to the tires. The average weight of one of these stackers is 20,000 lbs. thus putting a load of about 10,000 lbs. per tire. Very heavy tires with sufficient reinforcements are required to prevent these blow-outs which is not satisfactory from a design or cost aspect.

It has also been suggested that two tires may be used to increase the safety factor during transportation of these stackers. However, if two tires are used with the devices of the prior art, when the stacker is put into the operating position, only one tire will be on the ground and the weight is not distributed equally. A further drawback to using two tires is the accompanying increase in the width of the stacker. Most jurisdictions placed a maximum of 12 feet for the width of a vehicle on the roads. The use of a double tire will increase the width of many stackers beyond this legal limit and thus prevent them from being transported on public roads.

SUMMARY OF THE INVENTION

Accordingly, it is an object of the present invention to at least partially overcome these disadvantages by providing a novel axle construction for radial stackers which allows the maximum stockpiling capacity to be obtained during the operation stage and also, during the transportation stage, the safety factor to be increased without increasing construction costs of the stacker.

To this end, in one of its aspects, the invention provides a novel axle assembly for use with a portable radial stacker for stockpiling a material including a conveying means adapted to convey said material from a material loading position to a material unloading position, a support means adapted to support said conveying means at an upwardly inclined angle during the stockpiling stage and in the horizontal position during the transporting stage, and an axle assembly adapted to support one end of the support means on the ground and to move said radial stacker in an arc about the material loading position, said axle assembly also adapted to support and move said stacker during the transporting stage from one place to another place, said axle assembly comprising:

(a) a transverse member secured to the end of the support means proximate the ground and aligned transverse to the direction of the conveying means;

(b) two pairs of tires, each pair of tires having an axle bar therebetween;

(c) two torsion levers, one end of each torsion lever secured to the central portion of the axle bar between each pair of tires and the opposite end of each torsion lever pivotally connected to one end of said transverse member, wherein each tire has an independent suspension mounting on each respective end of each axle bar.

In another of its aspects, the invention further provides a portable radial stacker for stockpiling a material comprising:

(a) a conveying means adapted to convey said material from a material loading position to a material unloading position;

(b) a support means adapted to support said conveying means at an upwardly inclined angle during the operational stage, and horizontally during the transportation stage;

(c) an axle assembly adapted to support one end of the support means on the ground and to move said radial stacker in an arc about the material loading position during the operational stage, said axle assembly also adapted to support and move said stacker during transportation of said stacker from one place to another place, said axle assembly comprising:

(a) a transverse member secured to the end of the support means proximate the ground and aligned transverse to the direction of the conveying means;

(b) two pairs of tires, each pair of tires having an axle bar therebetween;

(c) two torsion levers, one end of each torsion lever secured to the central portion of the axle bar between each pair of tires and the opposite end of each torsion lever pivotally connected to one end of said transverse member, wherein each tire has an independent suspension mounting on each respective end of each axle bar, and wherein the pivotal connection between each torsion lever and each respective end of said transverse member is adapted to align the tires parallel to said conveying means when said stacker is being transported and transverse to said conveying means when said stacker is stacking said material, the width between the outer peripheral edges of the tires during transportation is less than 12 feet.

BRIEF DESCRIPTION OF THE DRAWINGS

Further objects and advantages of the invention will appear from the following description taken together with the accompanying drawings in which:

FIG. 3 is a side view of a radial stacker in the travelling position embodying the present invention;

FIG. 4 is a side view of a radial stacker in the operating position embodying the present invention;

DESCRIPTION OF THE PREFERRED EMBODIMENT

Figure 1:
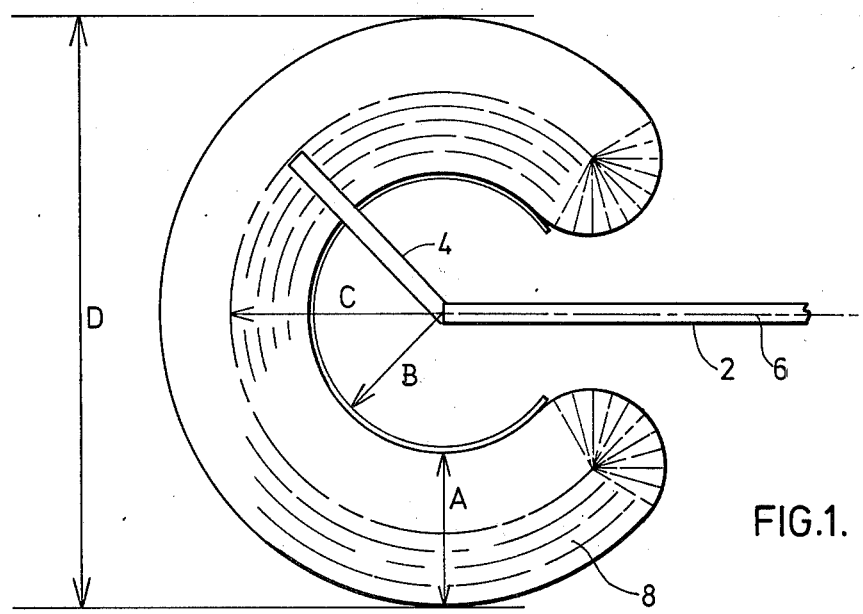
FIG. 1 is a schematic representation of a stack of material which has been stacked by a radial stacker.

Reference is first made to FIG. 1 which is a schematic representation of a stack of material which has been stacked by a radial stacker. The radial stacker comprises a first stationary portion 2 and a pivoting portion 4. Material 6 is loaded onto the terminal end of portion 2 and conveyed to the pivoting portion 4. Portion 4 of the stacker pivots in an arc and deposits the material 6 in the configuration generally indicated as 8. In order to demonstrate the advantages of a radial stacker when compared to a circular stockpile, the following table illustrates the increased amount of material which may be stacked in the same area when compared to a circular stockpile. In the table, A represents the width of the stack; B represents the distance from the pivot point of the stacker to the inner edge of the stack; C represents the distance from the pivot point of the stacker to the centre line of the highest point in the stack; and D represents the diameter of the stack. The length of the pivoting portion 4 is referred to under the column "radial stackers" and the height of the stack is in the column indicated as "height". A comparison is made between a 270° radial stack and a circular stockpile assuming that the material stacked weighs 100 lbs/cu. ft.

TABLE 1

| Radial Stackers | A | B | C | D | Height | 270° Stockpile | | Cir. Stockpile | |
|---|---|---|---|---|---|---|---|---|---|
| | Feet | Feet | Feet | Feet | Feet | cu. yds. | Tons | cu. yds. | Tons |
| 100'0" | 96 | 48 | 96 | 288 | 34 | 28,865 | 38,968 | 3,036 | 4,099 |
| 120'0" | 114 | 58 | 114.5 | 343 | 40 | 47,675 | 64,363 | 6,417 | 8,664 |
| 150'0" | 141 | 72 | 143 | 427 | 50 | 92,838 | 125,332 | 12,272 | 16,567 |
| 180'0" | 167 | 85 | 171.5 | 510 | 59 | 154,891 | 209,103 | 20,314 | 27,424 |

It is quite evident from the results shown in Table 1 that radial stacks are capable of stacking much more material than circular stockpiles.

Referring now to FIG. 4 there is shown a side view of a radial stacker in the operating position, embodying the present invention.

The radial stacker generally indicated as 8 consists of a conveying means 10 which in this embodiment, is an endless conveyor belt upon which the material 12 to be stacked, is placed at the end 14 of the stacker which rests on the ground. The conveying means 10 may be of any well-known construction and is not limited to a conveyor belt. The means 10 may include augers, conveyor belts, buckets, sections or any other conveying means well-known in the art.

The material 12 to be stacked is loaded onto the conveyor means 10 and conveyed to the opposite end 15 of the stacker where it is stockpiled in a conical shaped-pile generally indicated at 16. The pile 16 will achieve its own material shape and size depending in part on the material to be stacked and also the height of the end 15 of the stacker above the ground. It is seen from FIG. 4 that the maximum amount of material which can be stacked is achieved when the height of the stacker end 15 above the ground causes the material to flow and stack such that the peripheral edge of the stack 18 is adjacent to but not in contact with the wheels 20 of the stacker.

If the height of the end 15 of the stacker is raised higher, the material will cover the wheel 20. It will then be impossible to remove the stacker from the stacking position once the stacking operation is completed if the wheel 20 is buried. If the end 15 is lowered, the pile itself will be lower and less material can be stacked in the same stacking area.

The stacker assembly 8 comprises a conveying means 10 to convey the material 12 to be stacked and a supporting structure 22. The supporting structure comprises a main frame 24, rear pulleys 26, front pulleys 28 and, as shown in FIG. 4, an endless conveyor belt 10. The belt may be driven in any desired manner by a driving motor 30 such as an electric motor, a gasoline motor or the like.

The main frame 24 of the stacker may be, as shown in FIG. 4, comprised of two foldable sections 32 and 34 with the center section 36 therebetween. As shown in FIG. 3, these foldable sections 32 and 34 fold over the centre section 36 during the transportation stage.

The frame 24 of the stacker is supported by a pair of arms 38, 40; arm 38 is an affixed or stationary arm and arm 40 is telescoping arm, these arms being connected to the peripheral portions of the center section 36 of the main frame 24 at points 42, 44. The arms 38, 40 and the points 42, 44 allow the main frame 24 of the stacker to be raised and lowered as desired and secured in the operating position at the desired height.

Each of the arms 38, 40 is affixed to the novel wheel and axle assembly of the present invention which will be explained hereinafter.

Arm 38 is an arm of fixed length. The arm may pivot at point 42 and also pivots at the wheel assembly itself. Arm 40 is a telescoping arm whose length is adjustable. The telescoping means may be any means well known in the art including an inner arm and an outer sheath. When the length of the arm 40 is compared in the operating position (FIG. 4) and the travelling position (FIG. 3), it is seen that the telescoping is necessary to raise the end 15 to a height to allow the material 12 to be stacked and then to lower the end 15 for transportation. The angle between the ground and the main frame 22 is generally between 6° and 20° but this is dependent upon the material to be stacked. Thus, the distance between points 42 and 44 is fixed; the distance between point 42 and wheels 20 is fixed; the distance between point 44 and wheels 20 is variable.

The height of the end 15 of the stacker depends upon the material to be stacked. If a material of mixed coarseness is discharged at a great height, the finer material will separate from the coarser material because the heavier coarse material falls faster. Also, with heavy coarse material, a much more compact pile is obtained. The telescoping arm 40 therefore lends greater flexibility to the stacker.

FIG. 3 shows the stacker of FIG. 4 in one travelling position and affixed to the fifth wheel pin 46 of the truck 48. In the travelling position, the foldable sections 32 and 34 are folded over the centre section 36 and secured thereto. The telescoping arm 40 is telescoped to allow the main frame 24 of the stacker to lie in a substantially horizontal position and arm 38 pivots at point 42 if required.

In both the travelling (FIG. 3) and in the operating position (FIG. 4), the stacker 8 is supported on the ground by the wheel and axle assembly. The present invention provides a novel assembly whereby dual wheels are provided which may be rotated for travelling and operating positions but which maintain the maximum capacity of the stacker while achieving safe road conditions.

Figure 2:
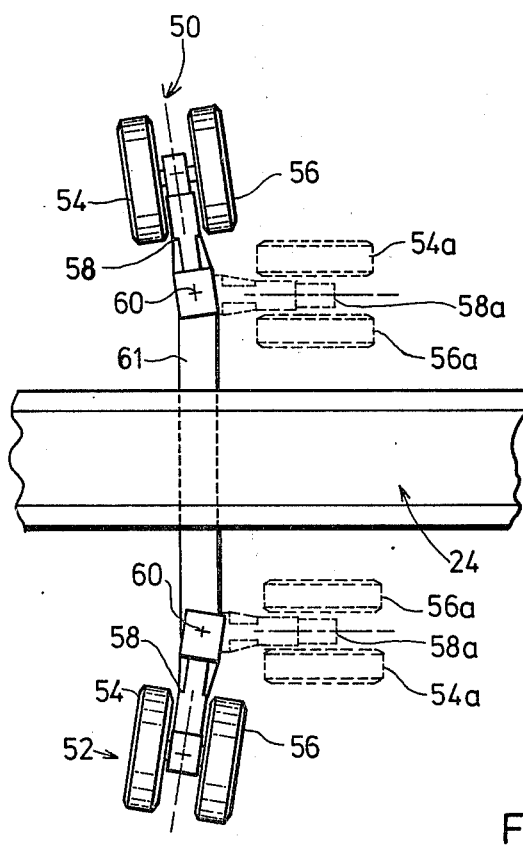
FIG. 2 is a top plan of the wheel and axle assembly of the present invention in the operating and in the travelling positions.

Referring now to FIG. 2 there is shown a top plan view of the wheel and axle assembly of the present application.

A pair of wheel assemblies 50, 52 each comprise two tires 54 and 56 mounted on an axle assembly 58. In the operating position, the wheels are aligned substantially perpendicular to the main frame 24 of the stacker 8. In the travelling position, shown in dotted lines, the tires 54A and 56A are aligned with the axle 58A parallel to the main frame 24 of the stacker 8. The axle assembly 58 pivots about point 60 as will be explained hereinafter.

Figure 5:
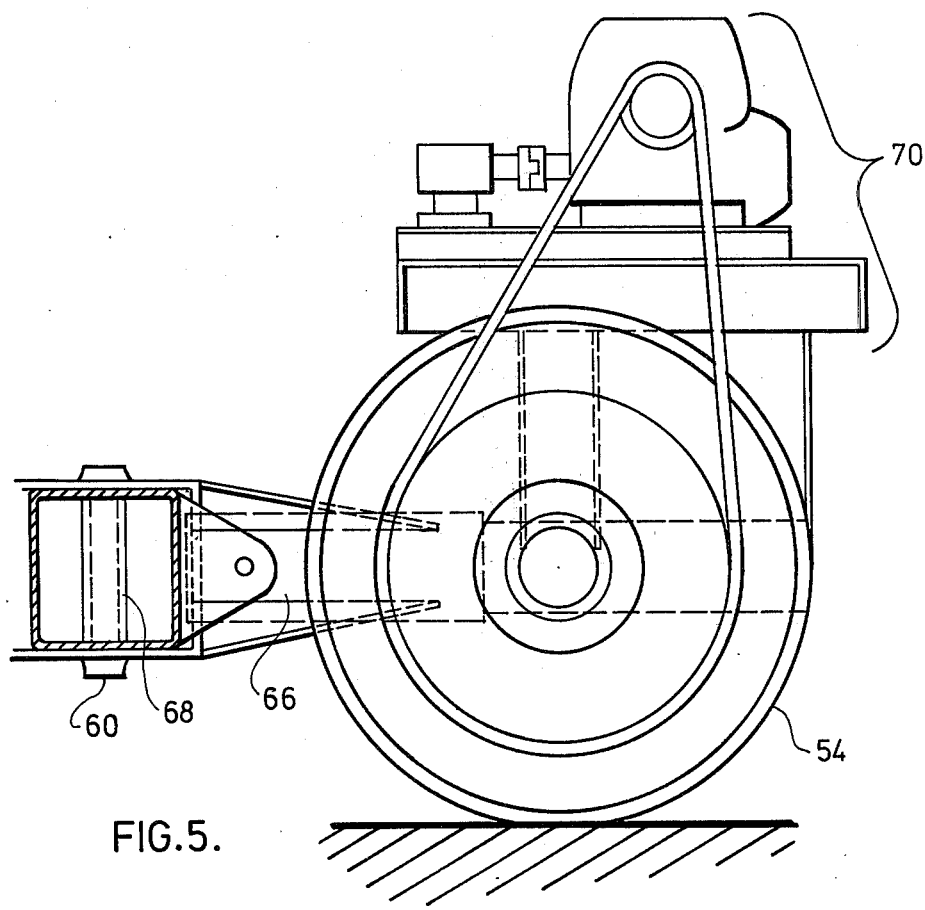
FIG. 5 is a side view of one wheel and axle assembly of the present invention.
Figure 6:
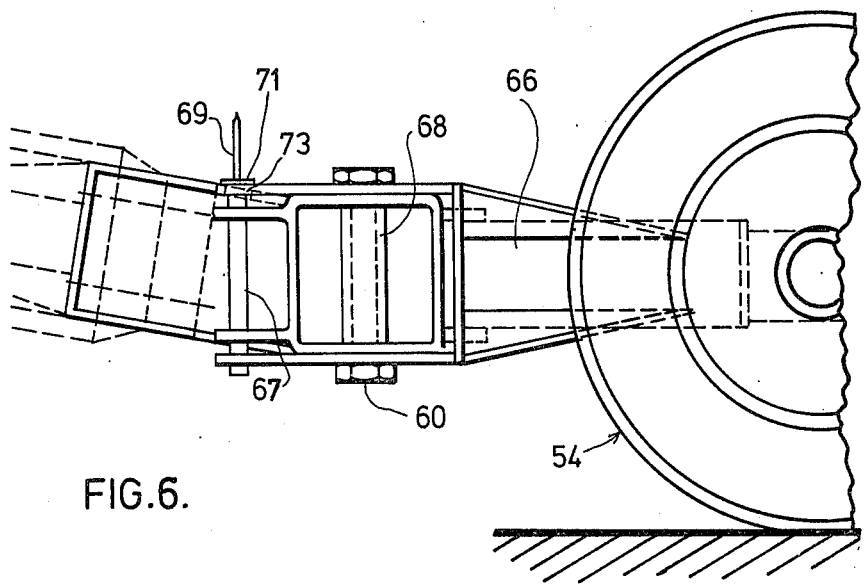
FIG. 6 is a side view of the wheel assembly opposite to the assembly of FIG. 5.
Figure 7:
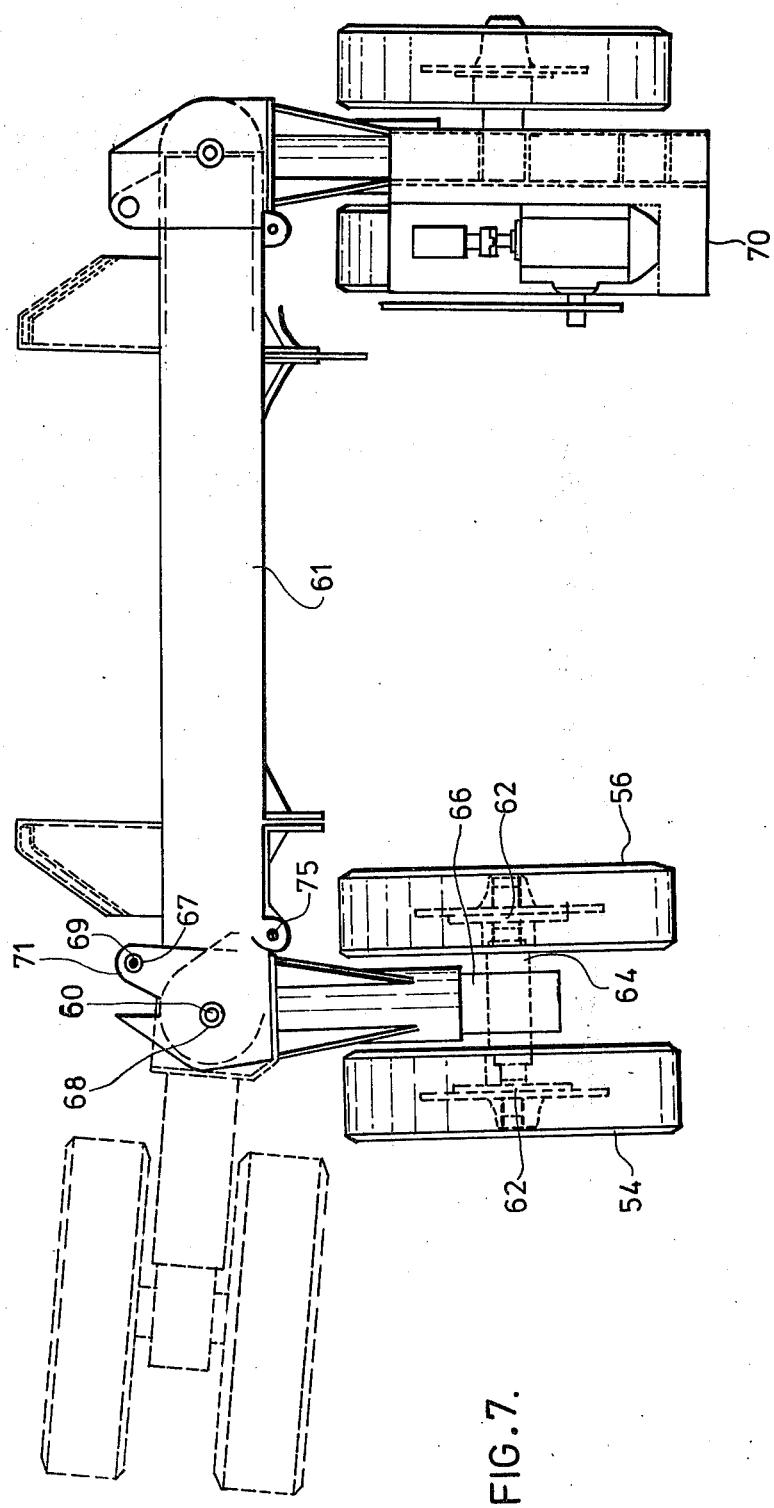
FIG. 7 is a top plan view showing the novel axle and wheel assembly of the present invention.

Referring now to FIGS. 5, 6 and 7 there is shown the construction of the axle and wheel assembly of the present invention. Each wheel 54, 56 is mounted on its own independent suspension 62. This is particularly important because it will equalize the load distribution on each wheel. The load distribution is dependent upon the independent suspension of each wheel mounting and thus, reduces the effect of road impulses during travelling.

The axle 64 between tires 54 and 56 is journalled in a torsion lever 66 which is pivotally connected to the pin 68 which is at pivot point 60 (see FIG. 2) of the transverse member 61. When the position of the tires is desired to be adjusted, the pin is released and the torsion lever 66 is rotated.

In order to secure the pivotal connection and as a safety precaution, a second pin 69 may be provided as shown in FIGS. 6 and 7. Flange 71 is provided on the outer peripheral surface of the torsion lever 66 and corresponds to a hole 73 in the axle 61. As shown in FIG. 7, a second flange 75 is provided for pin 69 when the wheels are pivoted into the position as shown in dotted lines. Casing 67 (FIG. 6) is provided to secure the upper and lower ends of the pin 69 to the novel assembly. Thus, a second attachment of the wheels is achieved in the desired position. As shown in FIG. 5, a motor assembly 70 is drivably affixed to one wheel. This motor is used to drive the stacker in the operating position about the arc to produce the radial shaped stack of material as depicted in FIG. 1.

The novel axle and wheel assembly provides a much improved construction. In the travelling position, the tires upon which the rear part of the stacker rests, have been moved behind the balance point of the tire. This effectively increases the load on the fifth wheel pin of the transporting vehicle which is a very desirable result. When impact impulses from the road, are transmitted to the tires, there will be a much reduced lifting action at the fifth wheel pin of the transporting vehicle. Thus, the inventors have eliminated the need for reinforcement at the fifth wheel pin and have increased the safety factor of the vehicle.

A second notable improvement is in the operation of the torsion lever 66. When the stacker is being transported, its weight bears directly on the wheels 54 and 56. When the impact impulses of the road are transmitted to the stacker, the lever 66 creates a torsional movement and transfers the load directly into the main carrier. The movement occurs in the transverse member 61 which absorbs any movement of the torsion lever and increases the fatigue limit of the stacker remarkably. This becomes extremely important and sometimes critical when the impact impulses occur on one side of the vehicle. The torsion lever 66 between the wheels causes a flexing motion and transfers the load to the main frame thereby reducing significantly the effect of the impact impulses.

The independent suspension of the tires and the effect of the torsion lever 66 have reduced the shock felt by the tires upon impact impulses by fifty percent. The independent suspension of the tires has also increased the load limit of the tires and helps to prevent blow-outs from occurring.

The increased safety of the stacker and the ability to optimize the stacking capability is attributable to the positioning of the wheels, the torsion lever, the independent suspension of the tire and the presence of the dual wheels. All these factors help to produce a better load distribution on the vehicle.

The prior art has suggested that by putting dual tires on a radial stacker, the same results may be ahcieved. However, the inventors have found that if dual tires are used on stackers of the prior art, the arms 38 and 40 must be reduced in size in order that the width between the outer edges of the tires is equal to or less than the maximum allowable width for these vehicles on public roadways. In most jurisdictions, this width is 12 feet and by merely using dual tires with the devices of the prior art, this width is exceeded. If as suggested, the arms 38 and 40 are reduced to accommodate the width between the tires, the capacity of the stacker is necessarily reduced.

In effect, if dual tires are used in the devices of the prior art, the flexibility and stability of the stacker are significantly reduced thereby resulting in a reduction in the stacking capability of the stacker. Also, if dual tires are used in these devices, the wheels are not supported equally thereby resulting in hazardous road conditions.

By the novel construction of the present invention, the inventors have utilized the maximum capacity of the stacker while remaining within the allowable limits for transportation and also, have increased the safety factors associated with the transportation of the stacker.

Although the disclosure describes and illustrates a preferred embodiment of the invention, it is to be understood that the invention is not restricted to this particular embodiment.

What I claim is:

1. In a portable radial stacker for stockpiling a material including a conveying means adapted to convey said material from a material loading position to a material unloading position, a support means adapted to support said conveying means at an upwardly inclined angle during the stockpiling stage and in the horizontal position during the transporting stage, and an axle assembly adapted to support one end of the support means on the ground and to move said radial stacker in an arc about the material loading position, said axle assembly also adapted to support and move said stacker during the transporting stage from one place to another place, said axle assembly comprising:
   (a) a transverse member secured to the end of the support means proximate the ground and aligned transverse to the direction of the conveying means;
   (b) two pairs of tires, each pair of tires having an axle bar therebetween and each pair of tires consisting of two coaxial tires;
   (c) two torsion levers, one end of each torsion lever secured to the central portion of the axle bar between each pair of tires and the opposite end of each torsion lever pivotally connected to one end of said transverse member, wherein each tire has an independent suspension mounting on each respective end of each axle bar, and
   (d) at least one drive means adapted to drive at least one pair of said two pairs of tires.

2. The radial stacker as claimed in claim 1 wherein the pivotal connection between each torsion lever and each respective end of said transverse member is adapted to align the tires parallel to said conveying means when said stacker is being transported and transverse to said conveying means when stacker is stacking said material.

3. The radial stacker as claimed in claim 2 wherein the width between the outer peripheral edges of the tires during transportation is less than 12 feet.

4. The radial stacker as claimed in claim 3 wherein said stacker is adapted to be releasably secured to the rear of a transporting vehicle whereby said stacker may be towed from one place to another.

5. A portable radial stacker for stockpiling a material comprising:
   (a) a conveying means adapted to convey said material from a material loading position to a material unloading position;
   (b) a support means adapted to support said conveying means at an upwardly inclined angle during the operational stage, and horizontally during the transportation stage;
   (c) an axle assembly adapted to support one end of the support means on the ground and to move said radial stacker in an arc about the material loading position during the operational stage, said axle assembly also adapted to support and move said stacker during transportation of said stacker from one place to another place, said axle assembly comprising:
   (a) a transverse member secured to the end of the support means proximate the ground and aligned transverse to the direction of the conveyng means;
   (b) two pairs of tires, each pair of tires having an axle bar therebetween and each pair of tires consists of two coaxial tires;
   (c) two torsion levers, one end of each torsion lever secured to the central portion of the axle bar between each pair of tires and the opposite end of each torsion lever pivotally connected to one end of said transverse member, wherein each tire has an independent suspension mounting on each respective end to each axle bar, and wherein the pivotal connection between each torsion lever and each respective end of said transverse member is adapted to align the tires parallel to said conveying means when said stacker is being transported and transverse to said conveying means when said stacker is stacking said material, the width between the outer peripheral edges of the tires during transportation being less than 12 feet, and
   (d) at least one drive means adapted to drive at least one pair of said two pairs of tires.

6. The portable radial stacker as claimed in claim 5 wherein said stacker is adapted to be releasably secured to the rear of a transporting vehicle whereby said stacker may be towed from one place to another.

7. The portable radial stacker as claimed in claim 5 wherein the pivotal connection between each torsion lever and the transverse member is a pair of pins extending through said torsion lever and said transverse member and releasably securing them together.

* * * * *